Jan. 16, 1968  B. A. FRIES  3,364,354
FILAMENT THICKNESS MEASURING BY MEANS
OF BACK SCATTERED BETA RAYS
Filed March 24, 1964  3 Sheets-Sheet 1

INVENTOR
BERNARD A. FRIES
BY
ATTORNEYS

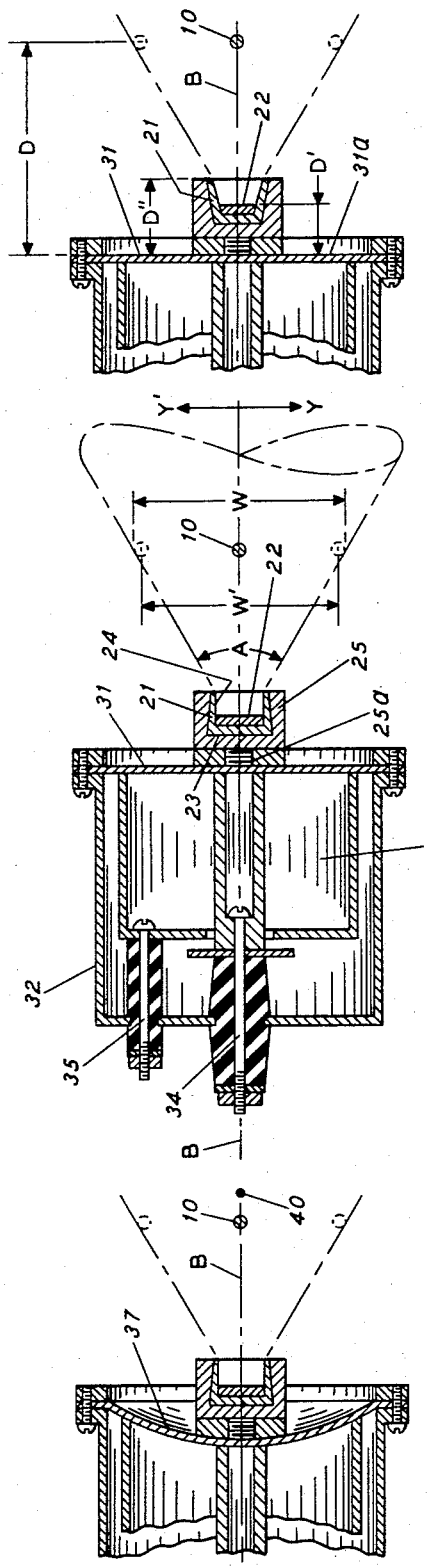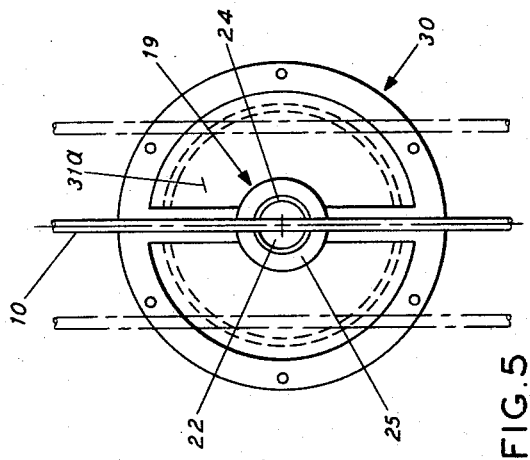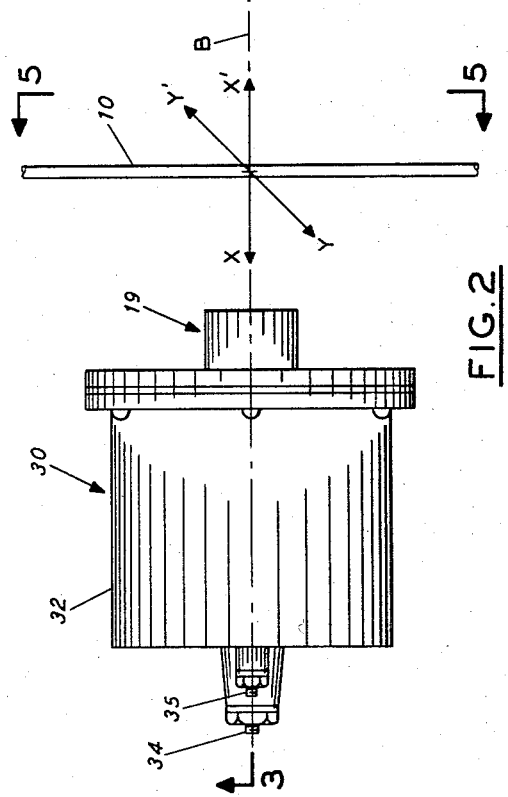

United States Patent Office 3,364,354
Patented Jan. 16, 1968

3,364,354
FILAMENT THICKNESS MEASURING BY MEANS
OF BACK SCATTERED BETA RAYS
Bernard A. Fries, Orinda, Calif., assignor to Chevron Research Company, a corporation of Delaware
Filed Mar. 24, 1964, Ser. No. 354,408
10 Claims. (Cl. 250—83.6)

This invention relates to measurements of filaments and more particularly to a method and apparatus for use in the measurement of the size of natural and synthetic filaments by a beta radiation back-scatter method.

A particular application of the method and apparatus of the invention is in the textile industry where the size of ultra-fine filaments must be measured. Size determinations have been effectively accomplished by continuously measuring weight per unit length of a filament and recording these measurements in units of denier, a metric unit indicating the density of the filament. In some processes the measurement of denier is used to control the formation of the filament. In those processes the filament usually moves at high speed from an extruder to a take-up reel, and thus any measuring device must be sensitive as well as rapid and accurate if its measurements are to be used to provide automatic control of the process forming the filament.

The foregoing process control by denier measurement has limitations that make it not fully adaptable to control of high-speed filament formation operations. Other schemes for physically measuring filament size have been tried, but most have the same or similar limitations with respect to process control.

Recent developments in this art have suggested measuring absorption of radiation from a controllable source, and various methods involving forward absorption beta radiation measurements have been tried and proven to be successful; see, for example, Instruments and Measurements, Academic Press, 1961, edited by Selge von Koch et al., volume 2, pages 746–756. However, experience has also shown that such methods may lack precision, accuracy, and resolution in applications both where the filament undergoes movements at high speeds between the extruder and take-up reel and where the filament undergoes erratic changes in location relative to the measuring means owing to system vibration.

In accordance with the present invention, the size of a filament undergoing movement at high speeds past a measuring means is measured without the use of mechanical positioning jigs by monitoring the back-scattered radiation from the filament after the irradiated particles have been formed into a beam having a transverse dimension at least equal to the variation in position of the filament relative to the measuring means. By this method the filament size of plastic or natural materials between 10 to 2000 deniers can be both quickly and inexpensively measured to surprising accuracy for control of the process by which the filament is formed.

In the method for measuring the filaments, a filament of natural or synthetic material travels in a first direction under tension from an extruder to a take-up reel but is allowed freedom to vary to the full extent provided by the production system in a second direction normal to the first direction. Intermediate the extruder and take-up reel, beta particles are emitted and formed into a beam having a transverse dimension that is at least equal to the variation in the second direction of the production system. The beta particles, being directed toward the position of the filament strike the filament in their travel. As these particles strike the filament, some are scattered by the process known as "back-scattering." The number of these back-scattered beta particles can be counted to indicate, to a statistical certainty, the weight per unit length of the filament in a range from about 10 to 2000 deniers within a variation of about ±1 denier at the lower end to about ±10 denier at the upper end of the range. The monitored back-scattered beta particles thus give a surprisingly accurate measurement of filament size.

In a preferred form of the apparatus the radiation source is a source of beta particles positioned intermediate an extruder and a take-up reel and in alignment with the filament to be measured. The transverse dimension of the beam is controlled by a collimator located between the beta source and the filament to form the beta particles emitted from the source into a beam having a transverse dimension at least equal to the variation in probable filament location as portions of the filament travel to the take-up reel. The radiation counter is either a Geiger tube, an ion chamber or a scintillation detector having a count capacity in the range of at least $10^5$ to $10^6$ counts per second and is positioned at the same side of the filament as the source and so as to count the back-scattered beta particles.

Other features of the invention will become more apparent from the detailed description of a preferred embodiment of the invention that follows, in which:

FIGURE 2 is a side elevation of a beta radiation gauge of the system of FIGURE 1;

FIGURE 3 is a longitudinal section taken along line 3—3 of FIGURE 2 illustrating the internal structure of the gauge;

FIGURE 4 is a fragmentary detail of a portion of the gauge of FIGURE 3 illustrating a modified collimator construction;

FIGURE 5 is a front elevation of the gauge of FIGURE 2 illustrating in phantom variations in location of the filament relative to the gauge that could be encountered during the manufacturing process;

FIGURE 6 is a partial longitudinal section of the gauge of FIGURE 2 modified at the detector to increase sensitivity;

The filament materials to be measured by the method and apparatus of the invention must have desirable atomic characteristics compatible with beta radiation back-scatter methods. Illustrative examples of compatible materials include natural fibers such as cotton, wool and hemp and synthetic fibers formed of polypropylene, polyethylene, and polyamides of the nylon type. Sizes of filaments measured in the method have a preferred range from about 50 to 2000 deniers and can be from 10 to 2000 deniers where a denier is 1.1 $\mu$mg./cm. Measurements in accordance with the apparatus and method of the invention become less and hence less sensitive to absolute changes in filament size beyond the upper limit of operation because of the nonlinear relationship between the number of back-scattered beta particles and the size of the filament.

Figure 1:
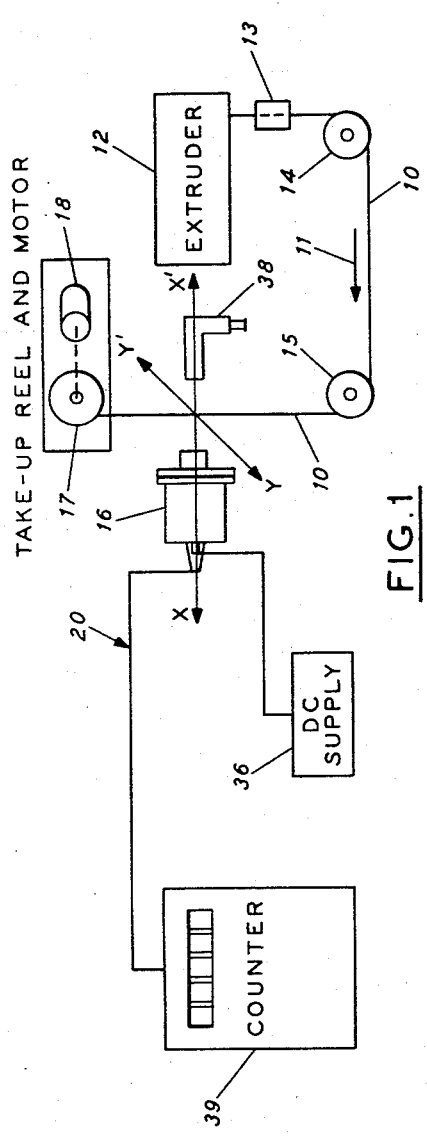
FIGURE 1 is a partially schematic diagram of a filament forming apparatus including a beta radiation back-scatter system embodying the invention.

Reference should now be had to the embodiment of FIGURE 1 where a length of thread-like filament 10 is drawn in the direction of arrow 11 from extruder 12 through heat sink 13 over guide rollers 14 and 15 and past back-scatter gauge 16 by means of a take-up reel 17 driven by motor 18. The filament whose weight per unit length is to be measured is placed under tension to reduce vibration in the direction of coordinates XX' by appropriate changes in the rotational speed of motor 18. Movement of the filament is not restrained in the direction of coordinates of YY' normal to XX'.

The beta gauge is essentially a two-part device, consisting of a source system and a detector system. The source system is generally indicated at 19 in FIGURE 2, and the detector system is generally indicated at 20 in FIGURE 1.

As the filament 10 is drawn past beta gauge 16 at speeds that range between 0 to 60 feet per second, beta particles are irradiated from the source system toward the filament. The beta particles are controlled to pass along the direction of a solid angle A (FIGURE 3) as they irradiate toward filament 10. The beta source 22 is supported on a collimator 21 having a barrel 24 formed as an extension of the base 23. The base and barrel of the collimator are preferably formed of aluminum. The barrel and base can be shielded against emission of X-rays into the detector by enclosing these parts within cylindrical lead shroud 25 having an end in contact with base 23. In such an arrangement, the thickness of the barrel 24 will be greatest at the base and decrease in a linear manner from the base to the end of the collimator as shown with the thickness of the shroud varying in a similar but reciprocal manner. Although shown with a side wall parallel to axis B of the gauge, the barrel may also have its side wall diverge outwardly in the form of a frustrum of cone as shown in FIGURE 4. The side walls of the shroud 25 and barrel 24 are always concentric, as shown in FIGURE 5. A threaded portion 25a of the shroud 25 is adapted to support the source at the central axis of the beta gauge.

The source 22 is generally within and supported on detector 30. As illustrated in FIGURES 2 and 3 the detector is an ion chamber but other detectors such as a Geiger tube may be used without departing from the intended scope of the present invention. As illustrated the detector has a window 31 through which beta particles back-scattered from the filament 10 will enter the detector, a support frame 32, a gas-filled inner chamber 33, an inner conductor 34 and an outer conductor 35. The conductors are insulated from each other and form the support frame so that a potential may be developed between the conductors by means of high voltage supply 36. Outer surface 31a of the window 31 is parallel to the movement of the filament and is concentric of axis B of the gauge, as shown in FIGURE 4, and is separated from the filament by distance D, from beta source 22 by distance D' and from the top of the collimator 21 by a distance D".

In the director of coordinates YY', the angle of the emergence, A, of the beta particles is controlled by the collimator so that the resulting width W of the beam at the intersection of the XX' and YY' coordinates is at least as wide as the variation in location of the filament. In this application the term "variation of filament location" is defined to mean the distance measured in the YY' coordinate direction over which the filament varies as the result of vibration in the production system in traveling from the extruder to the take-up reel, and is determined by measuring the distance between the axes of symmetry of portions of the filament that mark extremities of such variation, i.e., width W' in FIGURE 3. The midpoint of such variation defines a central axis C normal to axis B, parallel with the travel path of filament 10, and spaced a fixed distance from gauge 16, see FIGURES 3 and 5.

In controlling beta particles emitted from a radiation source, the magnitude of variation in filament location is first determined as by means of an optical inspection device 38 having an indexed reticle (FIGURE 1) followed by adjustment in system dimensions to provide a proper beam width. In adjusting the beam such as by providing a collimator and sources of different sizes, it has been found that the distances separating window 31 from the filament, the source 22 and the collimator 21 are extremely important in producing beam widths and beam intensities compatible with providing meaningful measurements. In this regard, for an operative device having a collimator mean diameter of 3.2 mm. and a thickness of 4.8 mm., the following ranges of distances are preferred.

| Distance: | Preferred range (mm.) |
|---|---|
| D | 7.0:10.0 |
| D' | 2.0:3.0 |
| D" | 4.0:5.0 |

It has further been found that the radiation source strength can be conserved by forming window 31 of the detector into a frusto-conical shape generally indicated at 37 in FIGURE 6 concave with respect to the filament so that a center of formation 40 lies on axis B of the gauge preferably above the filament as shown.

The arrival of beta particles in the detector 30 is measured by their reactions with gas in chamber 33. In passing through the chamber 33 the number of collisions occurring between the beta particles and the gas molecules is measured by the products of the collisions: positive and negative ions. During movement of the ions toward either electrode 34 or electrode 35, the inner electrode assumes a potential other than ground owing to the reduction in potential energy of the moving ions. This change in potential energy is amplified, compared, and visually displayed at indicator 39 to indicate by a suitable signal output whether the filament under test is within the size range established for the manufacturing process.

Figure 7:
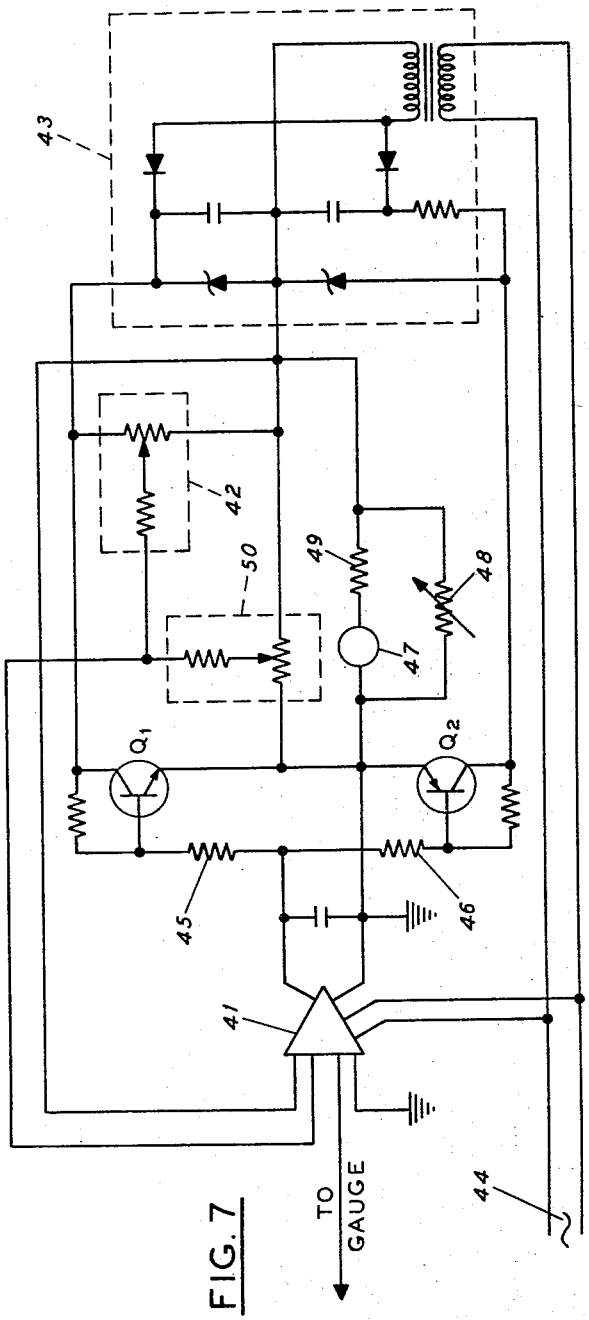
FIGURE 7 is a diagrammatic illustration of the counter circuit for measuring the number of back-scattered beta particles.

In the indicator 39, the first stage of amplification and comparison of the ion chamber signal occurs at a comparison-amplification circuit comprising a magnetic amplifier 41 connected to a direct current source 43 through potentiometer 42, see FIGURE 7. In the amplifier, the signal is first coupled to a first input winding and compared to the amplitude of the bias current coupled to a second input winding. The level of the bias current at the second winding is proportional to the midpoint of a range of filament sizes compatible with the manufacturing process and can be varied by means of potentiometer 42 interposed between the positive side and the center tap of direct current source 43. The load resistor of potentiometer 42 is serially connected to the magnetic amplifier to complete the circuit. The saturation level established in the core of the amplifier by means of alternating current source 44 allows the net compared current, having a polarity of the larger signal, to be amplified at the output winding.

In the output winding, the current is fed to a complementary current amplifier for the purpose of forward biasing either emitter-coupled transistor $Q_1$ or $Q_2$ forming the second stage of amplification and connecting to the amplifier 41 through resistors 45 and 46 respectively. Whether transistor $Q_1$ or $Q_2$ is forced into a conducting state depends on the polarity of the output current. More particularly, if the current is positive, transistor $Q_1$ is forward biased and conducts; if negative, transistor $Q_2$ conducts and transistor $Q_1$ remains in a quiescent state. Visual display of the amplified output of the transistors is achieved by means of a digital ammeter 47 shunting range switch 48 and serially connected to the emitter of each transistor. The ammeter 47 is connected to the center tap of the supply 43 through serially connected load resistor 49. Additional circuitry (not shown) may be added to warn the operators, through suitable alarms, that the filament under test is not within the proper size for the manufacturing process or that increased or decreased tension should be applied to the extruded filament to automatically correct for errors. To complete the counter circuit, a negative feedback gain control loop is provided by potentiometer 50 interconnecting the emitter of each transistor with the center tap of the supply 43 and providing a signal through a load resistor serially connected to the input windings of the magnetic amplifier.

By way of example, a gauge having the above-identified features and the following dimensions has been constructed and tested:

*Collimator 21*

Source 22:
- Material _____ Thallium 204.
- Diameter _____ 0.32 cm.

Base 23: diameter _____ 0.64 cm.

Barrel 24:
- Overall length _____ 0.48 cm.
- Thickness _____ .16 cm.

*Detector 30*

Window 31:
- Diameter _____ 2.5 cm.
- Type _____ Geiger-Müller tube.

*Filament 10*

Material—polypropylene.

Figure 9:
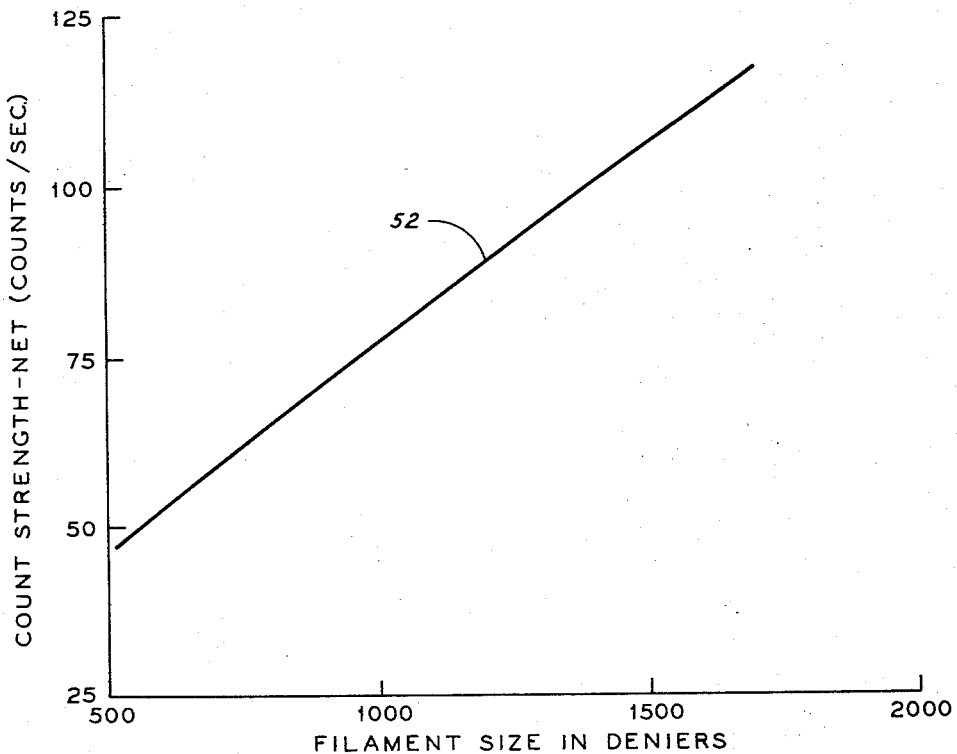
FIGURES 8 and 9 are performance curves of the beta radiation measuring system illustrating the noncriticality of spacial locations of the filament and gauge and the sensitivity versus filament density characteristic of the gauge for a group of test filaments.
Figure 8:
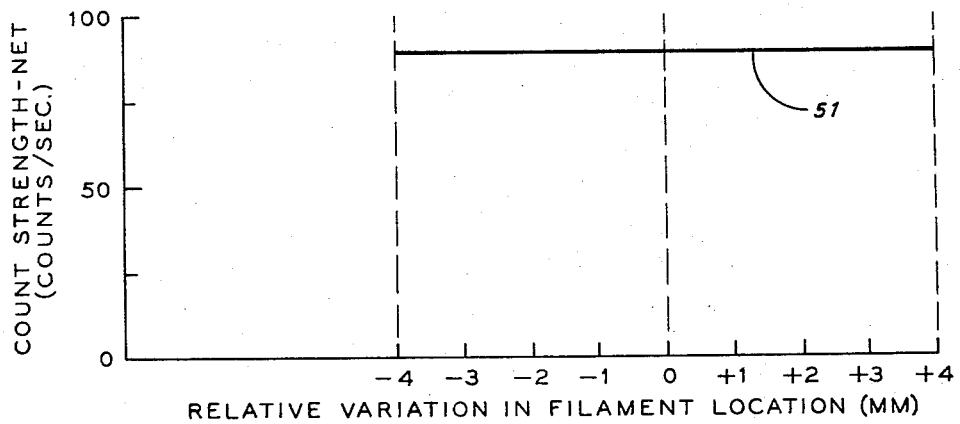

Performance curves of the constructed gauge are shown in FIGURES 8 and 9. In FIGURE 8, noncriticality of the placement of the filament along the Y–Y' direction is illustrated by the plot of count strength as a function of relative variation in filament location. The variation in filament location is 8 mm., while count strength defines curve 51 parallel with the abscissa axis over the range of interest. In FIGURE 9, measurable variation in filament size is plotted as a function of count strength determined by the number of beta particles detected by the gauge. Curve 52 demonstrates that for a given variation in filament size the probability of detection of back-scattered particles is sufficient to achieve statistically reliable measurements.

While certain preferred embodiments of the invention have been specifically disclosed, it should be understood that the invention is not limited thereto as many variations will be readily apparent to those skilled in the art and the invention is to be given its broadest possible interpretation within the terms of the following claims.

I claim:

1. A system for measuring the weight per unit length of a filament traveling between two points along a central axis wherein the path of said filament is substantially fixed in location relative to said axis in a first direction while the location of said path relative to said axis in a second direction normal to said first direction is variable within limits, comprising
   (a) a source of beta particles, said source being located adjacent to said axis so that said filament is irradiated by beta particles traveling in said first direction,
   (b) collimating means located between said filament and said source to form said emitted beta particles into a beam having a finite width in said second direction centered on said axis, said width being determined by the dimension of said filament in said second direction and the limits in variation of said path in said second direction such that said filament remains within said beam during irradiation thereof, and
   (c) means for detecting and counting beta particles from said source intercepting said filament and back-scattered from said filament to determine said weight per unit length thereof, said detection means being located on the same side of said filament as said source.

2. The system of claim 1 in which the means for detecting and counting said intercepted and back-scattered beta particles comprises an ion chamber having a beta-permeable window and first and second control electrodes, a direct current supply connected to said first control electrode, and a counting circuit connected to said second control electrode.

3. The system of claim 2 in which the counting circuit comprises a comparison-amplification circuit having input and output terminals, a complementary current amplifier conected to the output of said comparison-amplification circuit, said current amplifier comprising alternatively forward-biasable first and second transistors having coupled emitters, a visual display circuit connected to the emitters of said transistors, and a feedback loop interconnecting the emitters of said transistors with said input terminal of said comparison-amplification circuit.

4. A system for measuring the weight per unit length of a filament having a size range between 10 to 2000 deniers and traveling between two points along a central axis wherein said filament has a small deviation in location relative to said axis in a first direction and a substantial variation in location relative to said axis in a second direction normal to said first direction, comprising
   (a) a source of beta particles, said source being located adjacent to said axis so that said filament is irradiated by particles traveling in said first direction,
   (b) collimating means comprising a base supporting said source and a cylindrical barrel attached to said base and having an end remote from said source and an interior surface extending in said first direction toward said filament to form said emitted particles into a beam having a finite width in said second direction centered on said axis, said width being determined by the dimension of said filament in said second direction and the limits in variation of said path in said second direction such that said filament remains within said beam during irradiation thereof, and
   (c) means for detecting and counting a portion of said beta particles intercepting and back-scattering from said filament to indicate density thereof, said detection means being located on the same side of said filament as said source and comprising an ion chamber having a beta-permeable window and first and second control electrodes, said window defining a plane parallel to said second direction and normal to said first direction, a direct current supply connected to said first control electrode, and a counting circuit connected to said second control electrode.

5. The system in accordance with claim 4 in which the barrel of said collimating means includes inner and outer concentric cylinders formed of material having low X-ray emission and high X-ray absorption characteristics, respectively.

6. The system in accordance with claim 5 in which said inner cylinder of said barrel of said collimating means has a wall thickness linearly decreasing to a minimum at an end remote from said base.

7. The system of claim 4 in which the means for detecting and counting said intercepted and back-scattered beta particles comprises an ion chamber having a beta-permeable window and a central axis transverse to said window intersecting said filament, said window being frusto-conically shaped and concave with respect to said filament.

8. The system of claim 4 in which said filament, said source, said collimating means and said window of said ion chamber are spaced apart distances ranging from 7.0 to 10.0 millimeters for said input window to said filament, from 2.0 to 3.0 millimeters for said window to said source, and from 4.0 to 5.0 millimeters for said window to an end of said collimating means remote from said base.

9. The system of claim 1 in which said means for detecting and counting said beta particles back-scattered from said filament also detects background beta radiation of said system to aid in determining the net count strength for said filament and thereby the weight per unit length thereof.

10. The system of claim 4 in which said means for detecting and counting said beta particles back-scattered from said filament also detects background beta radiation of said system to aid in determining the net count strength for said filament and thereby the weight per unit length thereof.

References Cited

UNITED STATES PATENTS

| | | | |
|---|---|---|---|
| 2,886,714 | 5/1959 | Ewald | 250—83.3 X |
| 2,910,593 | 10/1959 | Laing et al. | 250—106 X |
| 2,962,615 | 11/1960 | Anton | 250—83.6 X |
| 2,964,633 | 12/1960 | Bernstein | 250—83.6 |
| 3,115,577 | 12/1963 | Joffe et al. | 250—106 X |
| 3,197,638 | 7/1965 | Sinclair | 250—105 X |

ARCHIE R. BORCHELT, *Primary Examiner.*